United States Patent
Gollnick

(10) Patent No.: US 12,037,981 B2
(45) Date of Patent: Jul. 16, 2024

(54) WIND TURBINE YAW OFFSET CONTROL BASED ON REINFORCEMENT LEARNING

(71) Applicant: Siemens Gamesa Renewable Energy A/S, Brande (DK)

(72) Inventor: Bert Gollnick, Hamburg (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 176 days.

(21) Appl. No.: 17/641,636

(22) PCT Filed: Aug. 3, 2020

(86) PCT No.: PCT/EP2020/071830
§ 371 (c)(1),
(2) Date: Mar. 9, 2022

(87) PCT Pub. No.: WO2021/052669
PCT Pub. Date: Mar. 25, 2021

(65) Prior Publication Data
US 2022/0307468 A1 Sep. 29, 2022

(30) Foreign Application Priority Data
Sep. 16, 2019 (EP) .................................... 19197544

(51) Int. Cl.
*F03D 7/04* (2006.01)
*F03D 7/02* (2006.01)
*G06N 20/00* (2019.01)

(52) U.S. Cl.
CPC ........... *F03D 7/0204* (2013.01); *F03D 7/046* (2013.01); *G06N 20/00* (2019.01);
(Continued)

(58) Field of Classification Search
CPC .... F03D 7/0204; F03D 7/046; F05B 2270/32; F05B 2270/321; F05B 2270/329; G06N 20/00

See application file for complete search history.

(56) References Cited

U.S. PATENT DOCUMENTS

| | | | |
|---|---|---|---|
| 11,674,498 B1 * | 6/2023 | Evans | F03D 7/0204 416/9 |
| 2021/0310461 A1 * | 10/2021 | King | G05B 13/027 |
| 2022/0145857 A1 * | 5/2022 | Harden | F03D 7/046 |

FOREIGN PATENT DOCUMENTS

| | | |
|---|---|---|
| DE | 102011075337 A1 | 11/2012 |
| EP | 2767710 A2 | 8/2014 |

(Continued)

OTHER PUBLICATIONS

"Reinforcement Learning for Wind Farm Production Optimization", Ip.com Journal, Ip.com Inc., West Henrietta, NY, US, May 15, 2015 (May 15, 2015), XP013167378, ISSN: 1533-0001 the whole document.

(Continued)

*Primary Examiner* — Sang K Kim
(74) *Attorney, Agent, or Firm* — Schmeiser, Olsen & Watts LLP

(57) ABSTRACT

Methods, systems, and devices for controlling a yaw offset of an upstream wind turbine based on reinforcement learning are provided. The method includes receiving data indicative of a current state of the first wind turbine and of a current state of a second wind turbine adjacent to the first wind turbine downstream along a wind direction, determining one or more controlling actions associated with the yaw offset of the first wind turbine based on the current state of the first wind turbine, the current state of the second wind (Continued)

turbine, and a reinforcement learning algorithm, and applying the determined one or more controlling actions to the first wind turbine.

17 Claims, 8 Drawing Sheets

(52) U.S. Cl.
CPC ..... *F05B 2270/32* (2013.01); *F05B 2270/321* (2013.01); *F05B 2270/329* (2013.01)

(56) References Cited

FOREIGN PATENT DOCUMENTS

| EP | 3117274 A1 | 1/2017 |
| WO | 2019145205 A1 | 8/2019 |
| WO | 2020028578 A1 | 2/2020 |

OTHER PUBLICATIONS

PCT International Search Report and Written Opinion of International Searching Authority dated Oct. 21, 2020 corresponding to PCT International Application No. PCT/EP2020/071830 filed Aug. 3, 2020.
Graf Peter et al: "Distributed Reinforcement Learning with ADMM-RL" 2019 American Control Conference (ACC), American Automatic Control Council, Jul. 10, 2019 (Jul. 10, 2019), pp. 4159-4166, XP033605245, Sections 1, II.A, III, IV.A, V.I), VI.A., B. , VII.

\* cited by examiner

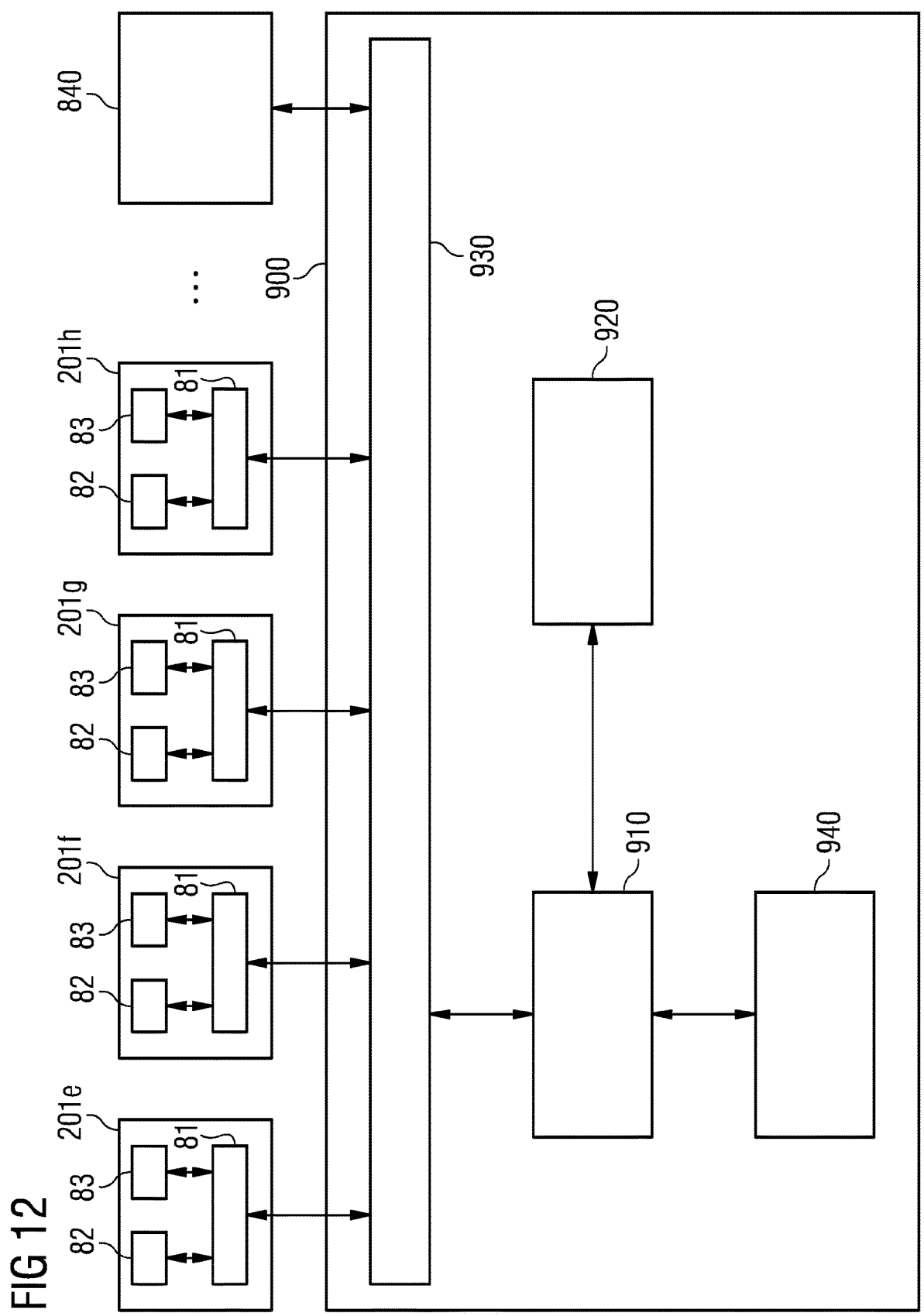

WIND TURBINE YAW OFFSET CONTROL BASED ON REINFORCEMENT LEARNING

CROSS-REFERENCE TO RELATED APPLICATIONS

This application claims priority to PCT Application No. PCT/EP2020/071830, having a filing date of Aug. 3, 2020, which claims priority to EP Application No. 19197544.0, having a filing date of Sep. 16, 2019, the entire contents both of which are hereby incorporated by reference.

FIELD OF TECHNOLOGY

The following relates to methods and devices for controlling yaw offsets of one or more wind turbines by utilizing reinforcement learning.

BACKGROUND

Wind turbines have been used for many years as a more environmental friendly energy source. More and more onshore and offshore wind turbine farms have been constructed all over the world. Currently, wind farms are operated in such a way that each wind turbine of a wind farm is operated at its individual optimum operation point according to the Betz limit.

Such techniques of operating each wind turbine of a wind farm at its individual optimum operation point face certain restrictions and drawbacks. The interaction between nearby wind turbines in a wind farm modifies the power output, compared to power outputs of isolated wind turbines. For example, along the wind direction, an upstream wind turbine generates a wake which influences a downstream wind turbine. Such effects can decrease the overall performance (e.g., total power output) of the wind farm.

When a wind turbine extracts energy from the wind, the speed of wind is reduced in the area of the wake and the downstream wind turbines receive a reduced wind speed. In a large wind farm, where the wind turbines are arranged in rows and columns, the downstream wind turbines are usually operating in the area of the wake of the upstream wind turbines. This results in reduced power output of downstream wind turbines. The operation of each wind turbine of a wind farm at its optimum level may not result in the maximum total/aggregate power output from the wind farm.

One of the most commonly used wake model to study the effects of the wake in a wind farm is the Park and Jensen model. According to the Park and Jensen model, rotating the nacelle of a wind turbine (yawing) changes the direction of the wake behind the wind turbine and results in a yaw offset. The yaw offset can affect the power production of an individual wind turbine. Typically, the larger the yaw offset of a wind turbine, the less the power production of the wind turbine. The yaw offset is the angle offset between the axis of the rotor plane and the incoming wind direction, around a rotational axis perpendicular to the horizontal plane. If the wind turbine is operated in such a way that the rotor plane faces the wind perpendicularly, then the yaw offset is zero degree.

Wind turbines are typically operated in a way such that they face the wind perpendicular to the rotor plane. This is a state of zero yaw offset. Any rotation of the wind turbine from this position would change the yaw offset. Changing the yaw offset from its zero degree position deflects the wake behind the wind turbine and further influences the power output of a wind turbine.

Although influences of the wake of the upstream wind turbine upon the downstream wind turbine can be mitigated or even eliminated by setting the yaw offset of the upstream wind turbine, the power production of the upstream wind turbine will decrease simultaneously. Thus, it is challenging and difficult to achieve an optimal (maximal) total power output of a wind farm by adjusting yaw offsets of some or all wind turbines in a wind turbine farm.

SUMMARY

Therefore, there is a need for advanced techniques of controlling yaw offsets of wind turbines.

A method of controlling a yaw offset of a first wind turbine (an upstream wind turbine) comprises receiving data indicative of a current state of the first wind turbine and of a current state of a second wind turbine (a downstream wind turbine) adjacent to the first wind turbine downstream along the wind direction, determining one or more controlling actions associated with the yaw offset of the first wind turbine based on the current state of the first wind turbine, the current state of the second wind turbine, and a reinforcement learning algorithm, and applying the determined one or more controlling actions to the first wind turbine.

A computer program or a computer-program product (non-transitory computer readable storage medium having instructions, which when executed by a processor, perform actions) or a computer-readable storage medium include program code that can be executed by at least one processor. Executing the program code causes the at least one processor to perform a method of controlling a yaw offset of a first wind turbine (an upstream wind turbine). The method comprises receiving data indicative of a current state of the first wind turbine and of a current state of a second wind turbine (a downstream wind turbine) adjacent to the first wind turbine downstream along the wind direction. The method also includes determining one or more controlling actions associated with the yaw offset of the first wind turbine based on the current state of the first wind turbine, the current state of the second wind turbine, and a reinforcement learning algorithm, and applying the determined one or more controlling actions to the first wind turbine.

A device for controlling a yaw offset of a first wind turbine comprises one or more processors. The one or more processors are configured to receive data indicative of a current state of the first wind turbine and of a current state of a second wind turbine adjacent to the first wind turbine downstream, determine one or more controlling actions associated with the yaw offset of the first wind turbine based on the current state of the first wind turbine, the current state of the second wind turbine, and a reinforcement learning algorithm, and apply the determined one or more controlling actions to the first wind turbine.

A method of controlling yaw offsets of a plurality of wind turbines being arranged in sequence along a wind direction, comprises receiving data indicative of a respective current state for each wind turbine of the plurality of wind turbines, determining controlling actions associated with the yaw offsets of the plurality of wind turbines based on the current states of the wind turbines of the plurality of wind turbines and a reinforcement learning algorithm, and applying the determined controlling actions to the wind turbines of the plurality of wind turbines.

A computer program or a computer-program product or a computer-readable storage medium include program code that can be executed by at least one processor. Executing the program code causes the at least one processor to perform a method of controlling yaw offsets of a plurality of wind turbines being arranged in sequence along a wind direction. The method comprises receiving data indicative of a respective current state for each wind turbine of the plurality of wind turbines, determining controlling actions associated with the yaw offsets of the plurality of wind turbines based on the current states of the wind turbines of the plurality of wind turbines and a reinforcement learning algorithm, and applying the determined controlling actions to the wind turbines of the plurality of wind turbines.

A device for controlling yaw offsets of a plurality of wind turbines being arranged in sequence along a wind direction comprises one or more processors. The one or more processors are configured to receive data indicative of a respective current state for each wind turbine of the plurality of wind turbines, determine controlling actions associated with the yaw offsets of the plurality of wind turbines based on the current states of the wind turbines of the plurality of wind turbines and a reinforcement learning algorithm, and apply the controlling actions to the wind turbines of the plurality of wind turbines.

It is to be understood that the features mentioned above and those yet to be explained below may be used not only in the respective combinations indicated, but also in other combinations or in isolation without departing from the scope of embodiments of the invention.

BRIEF DESCRIPTION

Some of the embodiments will be described in detail, with reference to the following figures, wherein like designations denote like members, wherein:

FIG. 1 schematically illustrates a part of a wind farm which includes 4 rows and 4 columns of wind turbines according to various examples;

FIG. 2 schematically illustrates an exemplary scenario of a first successive time step that indicates influence of yaw offsets of an upstream wind turbine on total power outputs of the upstream wind turbine and of a downstream wind turbine;

FIG. 3 schematically illustrates an exemplary scenario of a second successive time step that indicates influence of yaw offsets of an upstream wind turbine on total power outputs of the upstream wind turbine and of a downstream wind turbine;

FIG. 4 schematically illustrates an exemplary scenario of a third successive time step that indicates influence of yaw offsets of an upstream wind turbine on total power outputs of the upstream wind turbine and of a downstream wind turbine;

FIG. 5 schematically illustrates an exemplary wind turbine;

FIG. 6 schematically illustrates aspects with respect to a reinforcement learning algorithm 700;

Figure 11:
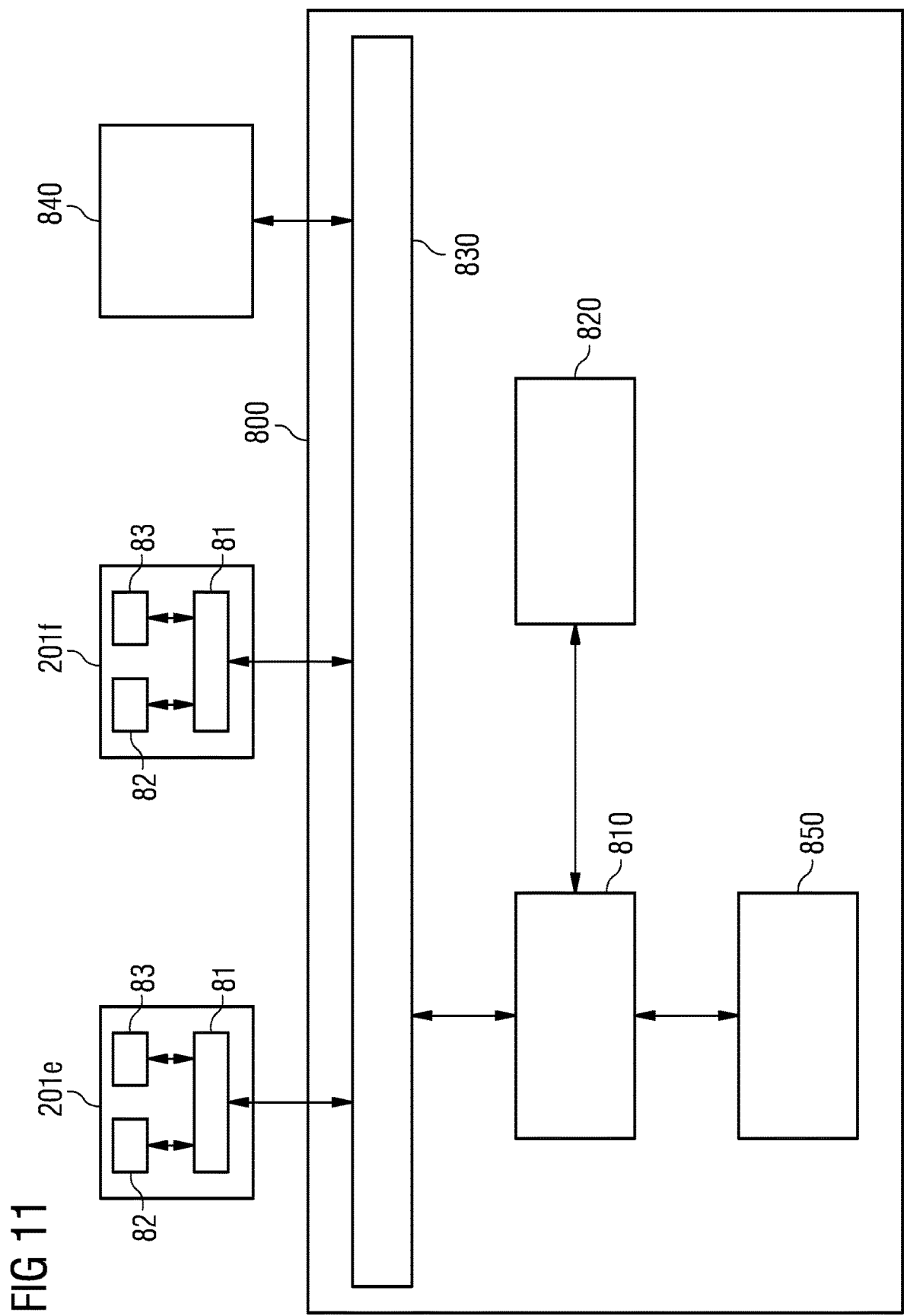

FIG. 11 schematically illustrates aspects with respect to a device for controlling a yaw offset of an upstream wind turbine of a wind turbine pair; and FIG. 12 schematically illustrates aspects with respect to a device for controlling yaw offsets of a plurality of wind turbines being arranged in sequence along a wind direction.

DETAILED DESCRIPTION

In the following, embodiments of the invention will be described in detail with reference to the accompanying drawings. It is to be understood that the following description of embodiments is not to be taken in a limiting sense. The scope of embodiments of the invention is not intended to be limited by the embodiments described hereinafter or by the drawings, which are taken to be illustrative only.

The drawings are to be regarded as being schematic representations and elements illustrated in the drawings, which are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various techniques described herein generally relate to controlling wind turbine yaw offsets. More specifically, yaw offsets of one or more wind turbines in a wind farm can be controlled by applying one or more controlling actions, e.g., when the one or more wind turbines are starting up. Thus, wakes generated by the one or more wind turbines can be steered in a controlled manner and influences of the wakes on downstream wind turbines can be reduced or mitigated. Accordingly, the wind farm can provide a higher aggregate power output or even maximum power output.

Figure 1:
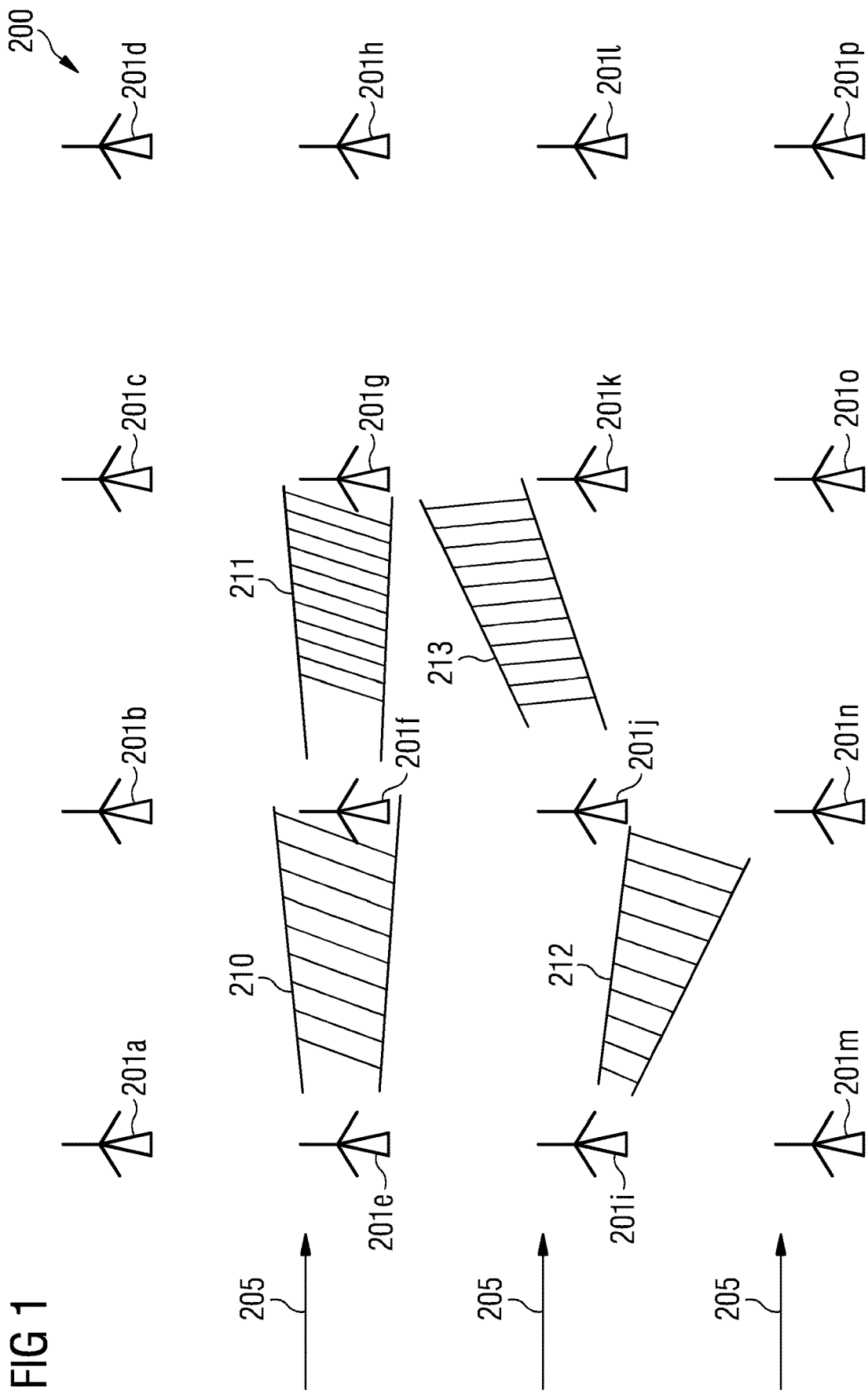

Considering a wind farm 200 including a plurality of rows and a plurality of columns of wind turbines, FIG. 1 schematically illustrates a part of the wind turbine farm 200. Wind is blowing with a direction indicated by arrows 205. The part of the wind turbine farm 200 includes 4 rows and 4 columns of wind turbines 201*a*-201*p*. Each wind turbine of the wind turbine farm 200 generates a wake. For example, wind turbines 201*e* and 201*f* operate at a state of zero yaw offset, and generate wakes 210 and 211, respectively. Consequently, wind turbines 201*f* and 201*g* are positioned in the wakes 210 and 211, respectively, and provide less individual power output. On the other hand, wind turbines 201*i* and 201*j* operate at a state of non-zero yaw offset, and generate wakes 212 and 213, respectively. The wakes 212 and 213 do not influence corresponding downstream wind turbines 201*j* and 201*k*. Thus, wind turbine 201*k* can provide a higher individual power output than that of wind turbine 201*g*. However, wind turbine 201*i* provides a smaller individual power output than that of wind turbine 201*e* because of the non-zero yaw offset.

Various techniques are based on the finding that it can be difficult to control the yaw offset of the upstream wind turbines 201*e* or 201*i* to have both upstream wind turbines 201*e* or 201*i* and downstream wind turbines 201*f* or 201*j* providing a higher power output.

Figure 2:
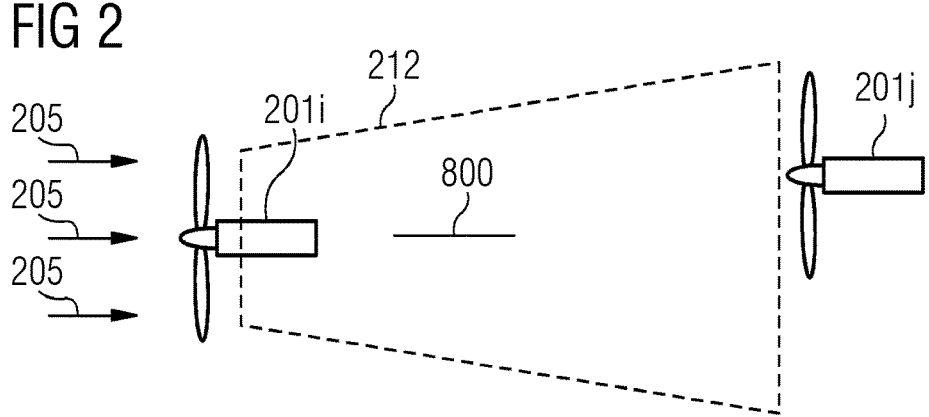
Figure 3:
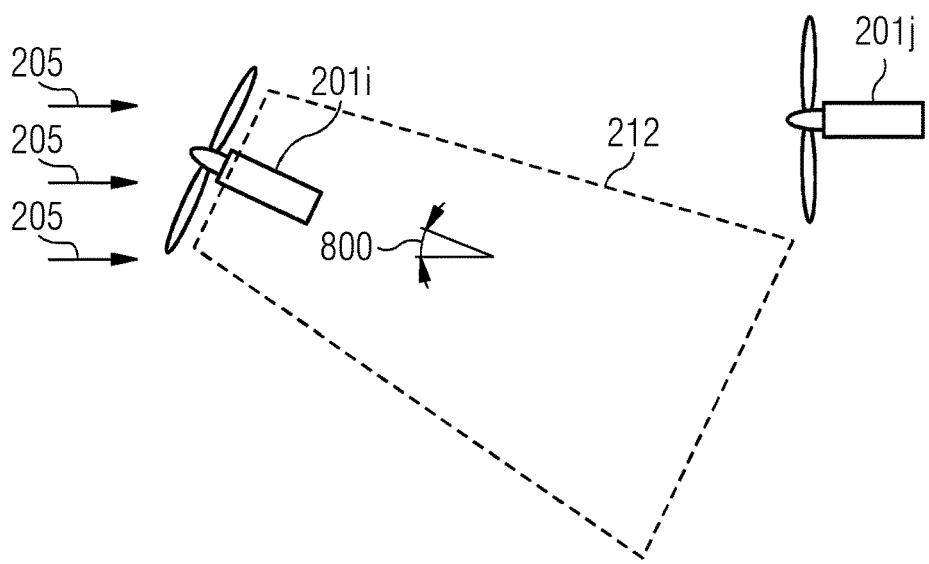
Figure 4:
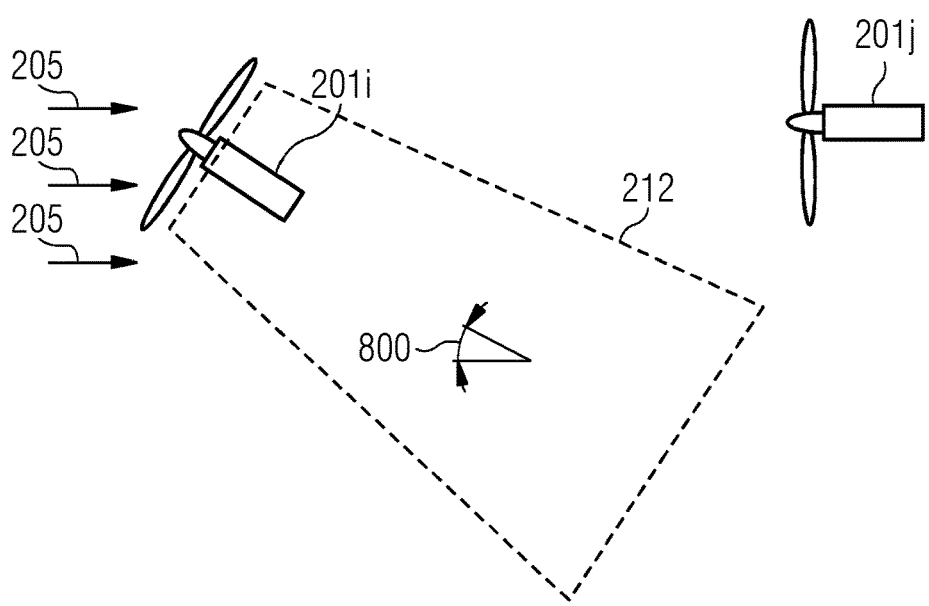

For example, FIGS. 2-4 schematically illustrate three exemplary scenarios of three successive time steps that show an influence of yaw offsets 800 of an upstream wind turbine (e.g., the wind turbine 201*i* of the wind farm 200) on total power outputs of the upstream wind turbine and of a downstream wind turbine (e.g., the wind turbine 201*j* of the wind farm 200).

In FIG. 2, the upstream wind turbine 201*i* has a state with a zero degree yaw offset and generates a wake 212 which directly hits the downstream wind turbine 201*j*. The upstream wind turbine 201*i* can generate its own optimal power output of 1,000 kW. On the other hand, the downstream wind turbine 201*j* can only generate a power output of 300 kW due to influences of the wake 212. In total, the two wind turbines can generate a sum of power output of 1,300 kW.

After setting the yaw offset 800 of the upstream wind turbine 201*i* to +10 degrees, as shown in FIG. 3, the upstream wind turbine 201*i* gets into a new state with a +10 degrees yaw offset and generates a new wake 212 which does not hit the downstream wind turbine 201*j*. The upstream wind turbine 201*i* can generate a power output of 800 kW, which is less than its optimal power output due to the +10 degrees yaw offset. On the other hand, the downstream wind turbine 201*j* can generate a power output of 700 kW, because there is no influences of the wake 212 on itself. In total, the two wind turbines can generate a sum of power output of 1,500 kW, which is more than that of FIG. 2.

By further increasing the yaw offset 800 of the upstream wind turbine 201*i* to +15 degrees, as shown in FIG. 4, the upstream wind turbine 201*i* assumes a further state with a +15 degrees yaw offset and generates a further wake 212 which also does not hit the downstream wind turbine 201*j*. The upstream wind turbine 201*i* can generate a power output of 400 kW, which is less than its previous power output due to the increase of the yaw offset. On the other hand, the downstream wind turbine 201*j* can still generate a power output of 700 kW, because the wake 212 still does not influence the downstream wind turbine 201*j*. In total, the two wind turbines can generate a sum of power output of 1,100 kW, which is the smallest among the three successive time steps.

Various techniques described herein can be executed to set the yaw offset 800 of the upstream wind turbine 201*i* to an angle to obtain a state in which the upstream wind turbine 201*i* and the downstream wind turbine 201*j* provide a large power output.

Figure 5:
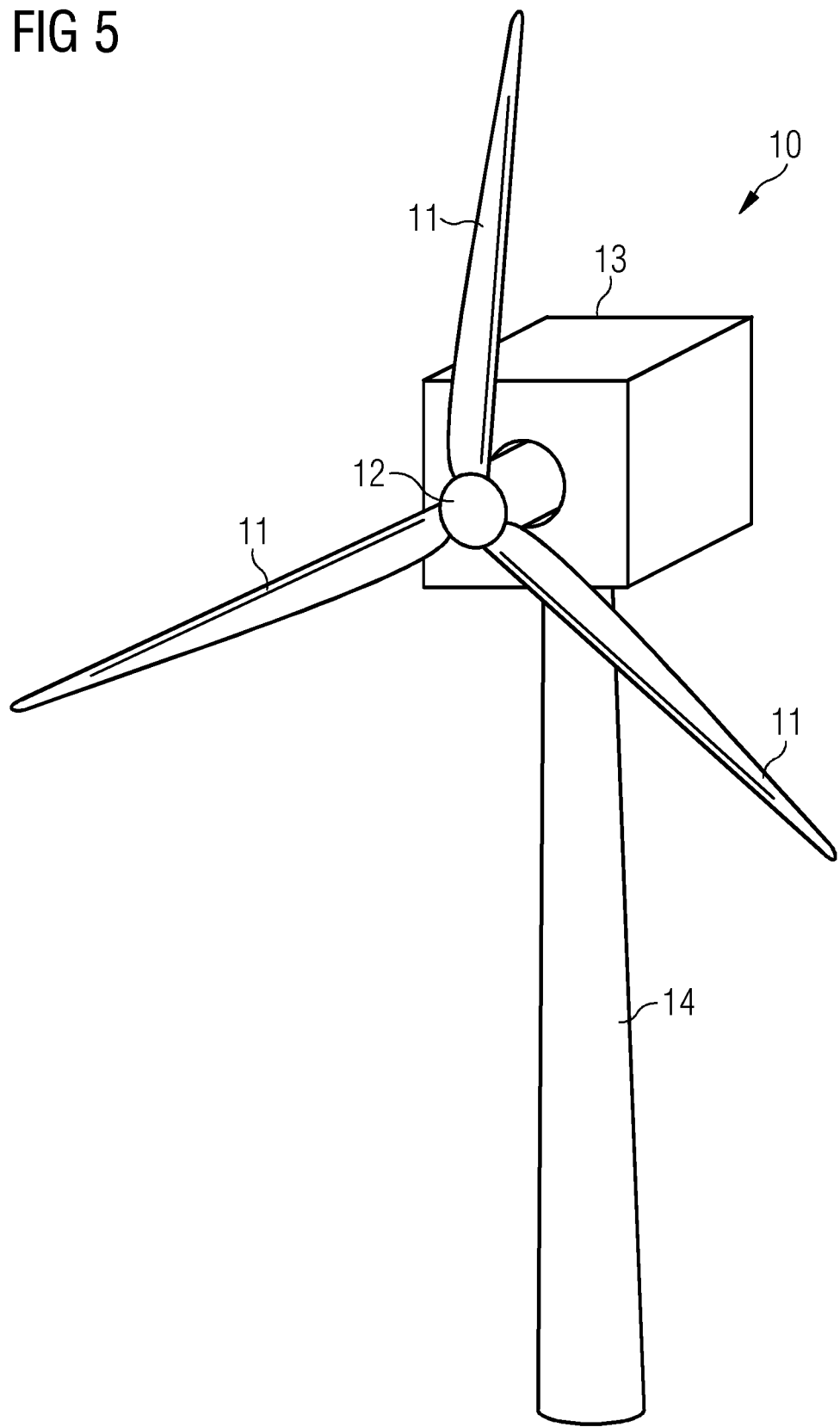

FIG. 5 schematically illustrates an exemplary wind turbine 10 which may be any wind turbine in the wind farm 200, such as wind turbines 201*a*-201*p*. The wind turbine 10 includes blades 11 attached to a rotor 12. The rotor 12 is connected to a nacelle 13, mounted on a tower 14. The nacelle 13 houses a generator, coupled with the rotor 12 rotating along with the blades 11. This connection can be via a shaft and gear. The yaw offset is an angle offset between the axis of the rotor 12 plane and the incoming wind direction, e.g., the wind direction 205 of FIG. 1.

Various embodiments of this invention provide methods and devices for determining one or more controlling actions associated with yaw offsets of one or more wind turbines to maximize total power output of a wind farm like the wind farm 200. The one or more controlling actions can be determined based on certain logic that relies on reinforcement learning.

Various techniques described herein generally relate to reinforcement learning. Reinforcement learning generally describes a machine-learning process associated with taking an appropriate action (here: how to map one or more environmental parameters indicating states of a first (or upstream) wind turbine and of a second (or downstream) wind turbine adjacent to the first wind turbine to one or more controlling actions associated with a yaw offset of the first wind turbine) that maximizes a reward (here: various options exist, e.g., total power output of the first wind turbine and of the second wind turbine). Reinforcement learning is generally different from supervised learning: labeled training data is not required; rather, reinforcement learning enables to learn during operation by monitoring the reward.

Data indicative of a current state of the first wind turbine 201*i* and of a current state of the second wind turbine 201*j* adjacent to the first wind turbine 201*i* downstream along the wind direction are received and one or more controlling actions associated with the yaw offset 800 of the first wind turbine 201*i* are determined using this information. This determination is, in particular, based on reinforcement learning.

Various techniques are based on the finding that reference techniques—in which each wind turbine of a wind farm 200 is operated at its individual optimum operation point—face certain restrictions and drawbacks. For instance, the interaction between nearby wind turbines in the wind turbine farm 200 modifies the power compared to their stand-alone values. Along the wind direction 205, an upstream wind turbine 201*i* generates a wake 212, which influences a downstream wind turbine 201*j* and further decreases the overall performance (e.g., total power production) of the wind farm 200. It is known that overall performance of the wind farm 200 is non-optimal if the waked turbine 201*j* is in full-wake of the upstream wind turbine 201*i*.

These drawbacks are mitigated by the techniques described herein by using reinforcement learning. Various kinds and types of environmental parameters indicating states of wind turbines described herein can be used in connection with the reinforcement learning. Here, the learning process is permanently ongoing and challenges itself. An optimized control of the yaw offset of each wind turbine of the wind turbine farm 200 would increase the performance of each pair of upstream and downstream wind turbines (e.g., 201*a*&201*b*, 201*b*&201*c*, 201*c*&201*d*, 201*e*&201*f*, 201*o*&201*p*) by steering the wake (e.g., 210, 211, 212, 213, etc.) away. The techniques described herein can help to reduce the performance loss of the whole wind farm 200 due to interference of the adjacent wind turbines.

After the one or more controlling actions associated with the yaw offset 800 of the first wind turbine 201*i* have been determined, the determined one or more controlling actions are applied to the first wind turbine 201*i*. Then, the same method or procedure for controlling yaw offsets 800 can be applied to another wind turbine 201*j* of an adjacent pair of wind turbine pair 201*j*&201*k*, e.g., until the yaw offsets 800 of all the wind turbines of the wind farm 200 have been appropriately set by corresponding controlling actions.

Figure 6:
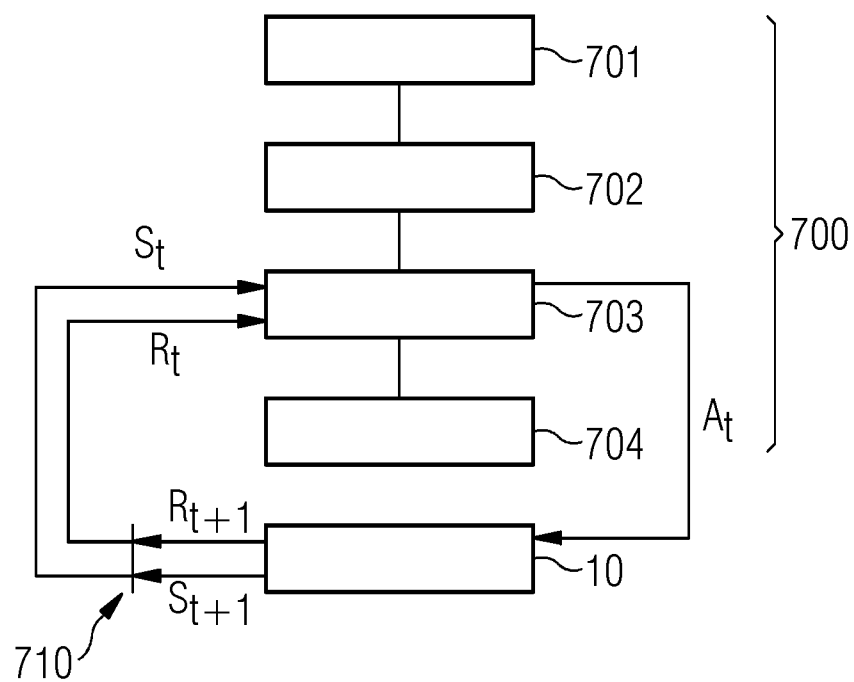

FIG. 6 schematically illustrates aspects with respect to a reinforcement learning algorithm 700.

Generally speaking, reinforcement learning is a type of machine learning and it is different from the other machine-learning techniques. Its inherent components are an agent module 703, an environment module 701, a policy module 702, and a reward module 704.

The reinforcement learning algorithm 700 includes an environmental module 701. The environmental module 701 is configured to receive data indicative of a current state of the first wind turbine 201*i* and data indicative of a current state of a second wind turbine 201*j* adjacent to the first wind turbine 201*i* downstream.

Examples of data indicating states of the first wind turbine 201*i* and of the second wind turbine 201*j* that can be used in the various examples described herein include a wind direction, a wind speed, or a yaw offset. The examples of data also may comprise a location of the wake 212, a temperature, rotational speed of the blades 11, a location of a wind turbine including longitude and latitude, air pressure, precipitation, humidity, local time, a turbulence intensity, a site elevation, a vertical wind shear, or a horizontal wind shear etc. The location of the wake 212 may be determined by the second wind turbine 201j. The techniques described herein are flexible in that a larger or smaller number of states (or parameters) can be considered.

There are various options available of obtaining the data indicative of states of the first wind turbine and of the second wind turbine. For instance, the data indicative of states can be measured by one or more sensors. Alternatively or additionally, the data indicative of states can also be simulated or generated by one or more computer programs or input by experts. For example, the simulated data indicative of states can be one or more outputs of a function in response to one or more inputs of measurement data obtained from one or more sensors. For instance, experts or engineers can utilize weather models to simulate extreme weathers and obtain simulated environmental parameters, such as wind speed, turbulence intensity, vertical wind shear, and horizontal wind shear etc. The function can be a linear function or a non-linear function represented by a neural network.

The reinforcement learning algorithm 700 also includes a policy module 702 that comprises one or more policies. The policy module 702 can determine a policy associated with a mapping from states of the first wind turbine and of the second wind turbine—obtained from the environmental module 701—to one or more controlling actions associated with the yaw offset of the first wind turbine to be taken when in those states. The policy may be a simple function or a lookup table that stores all or a part of possible state-action pairs for some examples, whereas it may involve extensive computation such as search process in other examples. In addition, the policy can also be a non-linear function realized by a neural network executing a supervised learning algorithm.

The reinforcement learning algorithm 700 also includes an agent module 703. The agent module 703 is configured to apply the one or more controlling actions, based on the input of the policy module 702. The agent module 703 cooperates with the policy module 702, and also with a reward module 704.

The reinforcement learning algorithm 700 also includes the reward module 704. The reward module 704 can determine a reward value in a short-term temporal context after performing each determined action—i.e., without any changes in the states. The reward module 704 also can determine a long-term reward value. The objective of the agent module 703 is to optimize the reward value. The reward value thus defines what are the "good" and "bad" controlling actions to be performed in a given state. The reward value may be used to alter the policy of the policy module 702; if a controlling action determined based on the policy is followed by low reward, then the policy may be changed to select some other controlling actions in that situation in the future. In general, the reward value may be a value of a stochastic function of the states of the first wind turbine and of the second wind turbine and the controlling actions taken.

Next, the function of the reinforcement learning algorithm 700 will be explained.

The agent module 703 interacts with the states of the first wind turbine and of the second wind turbine obtained by the environmental module 701. See action $A_t$. In this process, the agent module 703 cooperates with the reward module 704 to obtain a reward value for determining the appropriate controlling action. Then the agent module 703 may determine the next controlling action based on previous reward value and in this way define the next controlling action, which will then result in new reward values, and so on. So these terms, agent, environment, state, action (or controlling action), and reward, are the most important ones to understand it.

In FIG. 6, the subscript t refers to the current timestep and t+1 to the next timestep. The agent module 703 is in a current state $S_t$ associated with a current reward value $R_t$. The agent module 703 then applies the determined controlling action $A_t$, and thus also may change the environment (or state). As a result a reward value $R_{t+1}$ is gained, that can be either positive or negative, and the state changes, $S_{t+1}$. This is illustrated by the feedback branch 710.

This idea of reinforcement learning is different from other Machine Learning techniques. In supervised learning, a target variable is known upfront and an algorithm can learn the pattern between dependent and independent variables. In unsupervised learning, no target variable is known. In Reinforcement Learning, new knowledge is "learned" with time. In this regard reinforcement Learning is a mixture of unsupervised and supervised learning. It comes closest to "human" learning.

Next, a practical example of using reinforcement learning for control of a yaw offset 800 of a first wind turbine is explained. The data indicative of states of the first wind turbine and of the second wind turbine are monitored by the environmental module 701. The states of the first wind turbine and of the second wind turbine correspond to a pair of upstream and downstream wind turbines in a wind turbine farm 200. The environmental module 701 communicates with the first wind turbine's controller and the second wind turbine's controller which may have access to all data indicative of states of the first wind turbine and of the second wind turbine and provide the data to the environmental module 701. The agent module 703 can apply controlling actions based on a reference reward value or a predicted reward value of a predefined value function obtained from the reward module 704, the current states $S_t$ of the first wind turbine and of the second wind turbine, the measured reward value $R_t$, and the policy of the policy module 702.

The possible actions that the first wind turbine can perform based on the states of the first wind turbine and of the second wind turbine and rewards, comprise: setting the yaw offset 800 of the first wind turbine within a range of $-45°$ and $+45°$.

The states $S_t$ is defined by some or all parameters that have an impact on controlling yaw offset of the first wind turbine. Among these are: Measured wind speed (by nacelle anemometer); Location of the wake; Turbulence intensity; Site elevation; Outdoor temperature; Vertical or horizontal wind shear (if any of these are available from more complex measurement devices or control algorithms).

The reward value is defined as the total produced power output of the first wind turbine and of the second wind turbine.

An iterative learning process is performed, in which the first (upstream) wind turbine and the second (downstream) wind turbine for each timestep measure their states, respectively, and an action (setting the yaw offset of the first wind turbine within a range of $-45°$ and $+45°$ is determined for the first wind turbine. Then, a reward is obtained (total power output of the first wind turbine and of the second wind turbine after setting the yaw offset of the first wind turbine)

and the first wind turbine and the second wind turbine get a new state, respectively, which are defined by their condition measurements, respectively.

The learning process is continuous, because the algorithm runs repeatedly for the complete lifetime of the turbines—this is in contrast to a one-time parameter definition upfront.

With this setup, the algorithm 700 learns to adapt to its ambient conditions and can achieve an optimal total power output of the first wind turbine and of the second wind turbine by setting the yaw offset of the first wind turbine. The learning process goes on, so the first wind turbine and the second wind turbine learn to adapt to new states.

Next, details with respect to the policy of the policy module 702 are explained in connection with FIG. 7.

Figure 7:
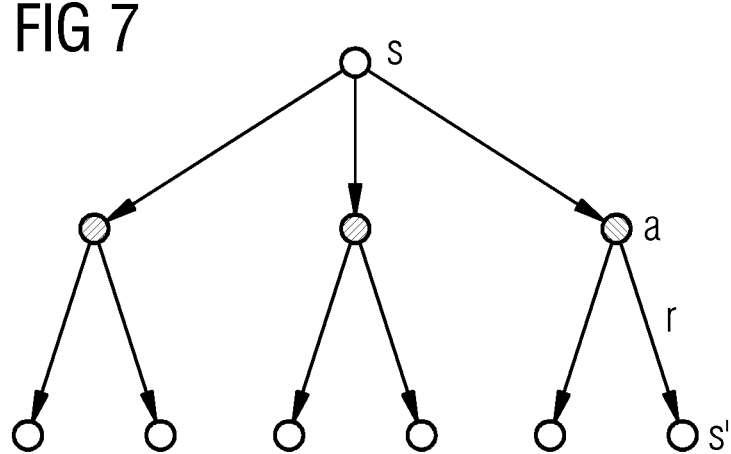
FIG. 7 is a backup diagram for a policy it.

FIG. 7 is a backup diagram for a policy it, by which a look-ahead from a state s to its possible successor states s' is illustrated. Each open circle represents a state and each solid circle represents a state-action pair (s, α). Starting from state s, the root node at the top, the agent module 703 could take any of some set of actions—three are shown in the diagram—based on its policy π. From each of these, the environment module 701 could respond with one of several next state, s' (two are shown in the figure), along with a reward, r, depending on its dynamics given by a function p.

The value function specifies what is good in a long run. Roughly speaking, the value of a future state is the predicted total amount of reward that the agent module 703 can accumulated over the future, starting from the current state, by selecting a chain of actions successively. Whereas the reward determines the immediate desirability of states, the value of value function indicates the long-term desirability of the chain of states after taking into account the states that are likely to follow and the rewards available in those states. For example, a state might always yield a low reward value, but still have a high value of the value function, because it is regularly followed by other states that yield high reward values.

The model for representing the environment considered by the policy module 702 is something which mimics behaviors of the environment, or more generally, which allows inferences to be made about how the environment will behave. For instance, the model might infer the next state and next reward given a state and action.

In various embodiments, solving a reinforcement learning task means, roughly, finding a policy that achieves a high reward value, e.g., immediately for fixed states or over a long run for varying states. An optimal policy is defined to be better than or equal to any other policies if its immediate reward value or the value of the value function is greater than or equal to that of any other policies for all states.

Figure 8:
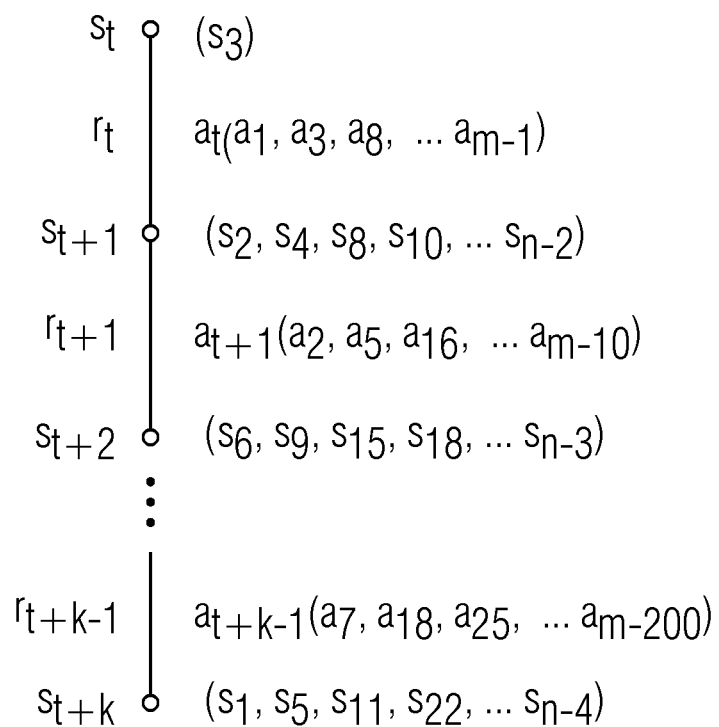
FIG. 8 is an example state tree to schematically illustrate core ideas of reinforcement learning algorithms that are utilized in various embodiments of this application.

FIG. 8 is an example state tree to schematically illustrate aspects of reinforcement learning algorithms that are utilized in various embodiments of this application. This state tree includes a plurality of nodes ($s_t$, $s_{t+1}$, ..., $s_{t+k}$), and a plurality of edges ($α_t$, $α_{t+1}$, ..., $α_{t+k-1}$). $S_t$ indicates a current state at time or step t. $S_{t+1}$, $S_{t+2}$, $S_{t+k}$ indicate three future states at step or time t+1, t+2, and t+k, respectively. $α_t$, $α_{t+1}$, and $α_{t+k-1}$ indicate actions taken at state $s_t$, $s_{t+1}$, and $s_{t+k-1}$, respectively.

Each state of $s_t$, $s_{t+1}$, ..., and $S_{t+k}$ may be a member of a subset or complete set of an state space S={$s_1$, $s_2$, ..., $S_{n-1}$, $s_n$}, in which n may be finite or infinite. Each member of the state space S represents a state which has been or would be encountered by the agent module 703. Each action of $α_t$, $α_{t+1}$, ..., and $α_{t+k-1}$ may be selected from a subset or complete set of an action space A={$α_1$, $α_2$, ..., $α_m$}, in which m may be finite or infinite. Each member of the action space represents an action that has been or would be performed by the agent module 703.

There are various options available for determining the one or more controlling actions. Two options that can be applied are (i) action-reward methods and (ii) action-value methods.

First (i) action-reward methods will be explained.

Each action may be associated with a reference reward value given that that respective action is taken at a respective state. For example, $r_t$ is the reference reward value given that $α_t$ is taken at $s_t$, and $r_t$ may be determined by a function of $α_t$ and $s_t$, e.g., $r_t=f(s_t, α_t)$, which may comprise a linear function or a neural network. Thus, different combinations of ($s_t$, $α_t$) result in different reference reward values and different actions taken at $s_t$ correspond to different reference reward values. For instance, $r_t=f(s_3, α_8)$, if $α_8$ is selected as the action $α_t$ at $s_t=s_3$.

For instance, the neural network for determining the reference reward value could be trained based on training data available based on historical site measurements of the state. The neural network could be a convolutional neural network.

At the current state $s_t$, in some cases, one action, e.g., $α_t$, may be determined based on a predefined set of actions, e.g., {$α_1$, $α_3$, $α_8$, ... $α_{m-1}$}, which is a subset of the action space A, by taking the respective reference reward value, e.g., $r_t$, into account. For example, the action $α_t$ may be determined as the one with the maximum reference reward value in the predefined set of actions. Alternatively or additionally, the action $α_t$ may be determined based on a predefined set of actions, e.g., {$α_1$, $α_3$, $α_8$, ... $α_{m-1}$}, using an arbitrary selection (i.e., using a random contribution).

In some other cases, at the current state $s_t$, more actions, e.g., $α_t$ and $α_{t+1}$, may be determined based on more predefined sets of actions, e.g., {$α_1$, $α_3$, $α_8$, ... $a_{m-1}$} and {$α_2$, $α_5$, $α_{16}$, ... $a_{m-10}$}, respectively, by taking the respective reference reward values, e.g., $r_t$ and $r_{t+1}$, into account. For example, both $α_t$ and $α_{t+1}$ may be determined as the one with the maximum reference reward value in the predefined set of actions, respectively. Alternatively or additionally, the actions $α_t$ and $α_{t+1}$ may be determined based on predefined set of actions, e.g., {$α_1$, $α_3$, $α_8$, ... $α_{m-1}$} and {$α_2$, $α_5$, $α_{16}$, ... $α_{m-10}$}, using an arbitrary selection (i.e., using a random contribution). In addition, the more predefined set of actions may be the same or different.

After applying the determined one or more actions, the reinforcement learning algorithms will receive measurement data associated with a current reward value, which is a real reward value (i.e., not a predefined reference reward value). For instance, this measurement could be a power measurement of a power output of the first wind turbine's generator and of the second wind turbine's generator. For example, after applying $α_t$ or $α_t$ and $α_{t+1}$, the reinforcement learning algorithms will receive the current reward value at time (or step) t+1 or t+2, respectively. Then, the reinforcement learning algorithms will perform a comparison between the reference reward value and the current reward value. Afterwards, the reinforcement learning algorithms are trained based on the comparison. As will be appreciated, the reinforcement learning algorithm can thus be trained without requiring predefined labeled training data (as would be the case, e.g., for supervised learning). Rather, during operation of the wind turbines, the training can be implemented using the comparison between the reference reward value (anticipated in the model) and the actual reward value indicated by the measurement data.

Next, (ii) action-value methods will be explained for determining the appropriate controlling action.

In some embodiments, at the current state $s_t$, the reinforcement learning algorithms may predict a reward value for a future point in time, e.g., time t+1 or t+k, for k>1, based on a predefined value function of the reinforcement learning algorithms. The value function may comprise a linear function or a neural network. Thus, a predicted reward value is obtained.

For instance, the neural network could be trained based on training data available based on historical site measurements of the states. The neural network could be a convolutional neural network.

Then, one action $\alpha_t$ or a chain of actions from $\alpha_t$ to $\alpha_{t+k-1-1}$ are determined based on the corresponding set of actions, respectively, by taking the predicted reward value into account. For example, the action $\alpha_t$ or the chain of actions from $\alpha_t$ to $\alpha_{t+k-1}$ may be determined as the one or the chain with the maximum predicted reward value.

After applying the determined one action $\alpha_t$ or chain of actions from $\alpha_t$ to $\alpha_{t+k-1}$, the reinforcement learning algorithms will receive a measurement data associated with a current aggregate reward value. For example, after applying $\alpha_t$ or the chain of actions from $\alpha_t$ to $\alpha_{t+k-1}$, the reinforcement learning algorithms will receive the current reward value at time (or step) t+1 or t+k, respectively. Then, the reinforcement learning algorithms will perform a comparison between the predicted reward value and the current aggregate reward value. Afterwards, the reinforcement learning algorithms are trained based on the comparison.

In various embodiments, the reinforcement learning algorithms may be pre-trained by using prior information or knowledge. The reinforcement learning algorithms may have a model to mimic behaviors of the environment.

By using reinforcement learning, appropriate controlling actions can be taken for the operational control of a yaw offset of an upstream wind turbine, without requiring exemplary supervision or complete models of the environment. Reinforcement learning algorithms can also make use of as many environmental parameters indicating states of wind turbines as possible to precisely select actions. In addition, the learning process of the reinforcement learning algorithms continues during normal operation of the wind turbines, therefore, the agent module 703 can learn to adapt to new states. Thus, optimal short-term or long-term goals can be achieved by applying the reinforcement learning algorithms.

Referring to FIG. 1 again, the yaw offset 800 of each wind turbine of the wind turbine farm 200 can be controlled by utilizing the above-mentioned reinforcement learning algorithms.

In some cases, all the wind turbines in the wind farm 200 are divided into pairs including two adjacent wind turbines, along the wind direction, such as wind turbine pairs 201*a*&201*b*, 201*b*&201*c*, and 201*c*&201*d* in FIG. 1. Then, the yaw offset of the upstream wind turbine of each pair is controlled based on current states of both wind turbines of the pair and a reinforcement learning algorithm 700. Finally, yaw offsets of all the wind turbines of the wind turbine farm 200 are optimized by performing a method based on reinforcement learning (e.g., reinforcement learning algorithm 700) iteratively.

Figure 9:
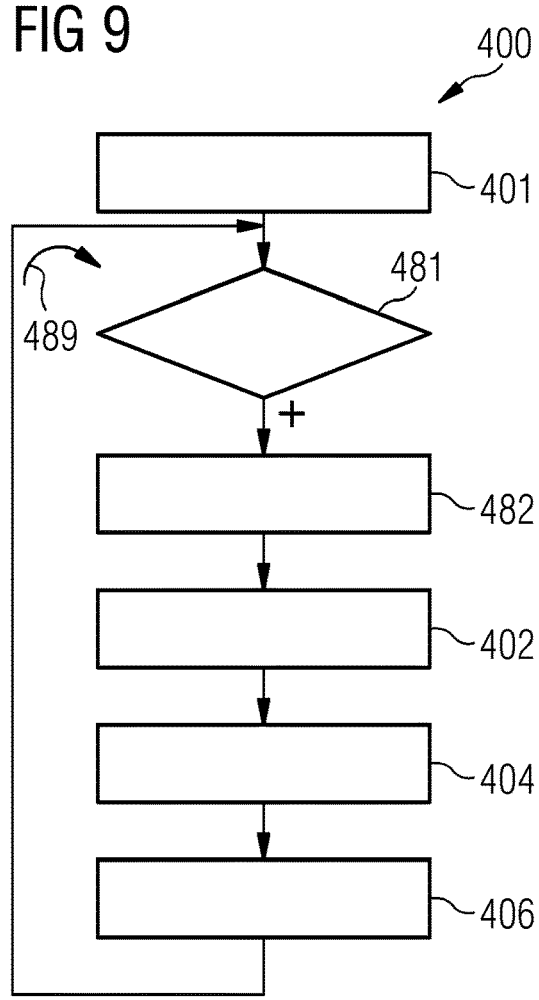
FIG. 9 is a flow diagram of an example method for controlling a yaw offset of an upstream wind turbine of a wind turbine pair.

FIG. 9 is a flow diagram of an example method 400 for controlling the yaw offset of the upstream wind turbine of each wind turbine pair of the wind turbine farm 200. For convenience, the method will be explained as being performed by a system of one or more computers located in one or more locations. For example, a reinforcement learning system running one or more reinforcement learning algorithms 700 mentioned above, can perform the method 400. Other devices including a control circuitry could implement the method of FIG. 9. The method may be executed by a processor upon loading program code, e.g., provided by a computer-readable storage medium, a computer program or a computer program product.

The method of FIG. 9 can employ one or more reinforcement learning algorithms 700 as described above in connection with FIGS. 1-8.

At optional step 401, the reinforcement learning algorithm 700 is pre-trained by using tuples of the following data: wind directions, wind speeds, yaw offsets, and sums of power outputs, wherein all the data are obtained from any two wind turbines that are adjacent to each other along the wind directions or expert knowledge, before implementing the reinforcement learning algorithm to control a yaw offset of a first wind turbine (an upstream wind turbine of a wind turbine pair).

For example, by referring to FIG. 1, a general reinforcement learning algorithm for all or part of the wind turbines of the wind turbine farm can be pre-trained by using the data obtained from any wind turbine pair of the wind turbine farm, such as, 201*a*&201*b*, 201*b*&201*c*, 201*c*&201*d*, 201*e*&201*f*, 201*o*&201*p*. Alternatively or additionally, a specific reinforcement learning algorithm for each wind turbine of the wind turbine farm 200 can also be pre-trained by using the data obtained from any wind turbine pair of the wind farm, such as, 201*a*&201*b*, 201*b*&201*c*, 201*c*&201*d*, 201*e*&201*f*, 201*o*&201*p*.

Then, for the following steps the (pre-trained) reinforcement learning algorithm is applied.

At optional step 481, it is checked whether a further pair of wind turbines remains to be subject to control. At the initial iteration 489 of step 481, this will be the case.

Accordingly, step 482 is executed; here, a current pair of wind turbines is selected from all wind turbine pairs that remain to be subject to control. This is the active pair of wind turbines; and these wind turbines are denoted first wind turbine and second wind turbine. The second wind turbine is downstream of the first wind turbine in the wind direction.

At step 402, data indicative of a current state of the first wind turbine and of a current state of a second wind turbine of the active pair is received.

The current states of the first wind turbine and of the second wind turbine specify a value of at least one of the following parameters: a wind direction, a wind speed, or the yaw offset. The current states also may specify a location of a wake generated by the first wind turbine. The one or more controlling actions comprise setting the yaw offset within a range of −45° and +45°.

At step 404, one or more controlling actions associated with the yaw offset of the first wind turbine based on the current state of the first wind turbine, the current state of the second wind turbine, and a reinforcement learning algorithm, e.g., the reinforcement learning algorithm 700 of FIG. 6, are determined.

The reinforcement learning algorithm may utilize any one of the above-mentioned action-reward methods or the action-value methods. In addition, the reinforcement learning algorithm also may utilize other existing reinforcement learning algorithms, such as, Q-Learning, Deep Q-Learning, Double Deep Q-Learning, Dynamic Programming (DP), Temporal-Difference (TD) Learning, Monte Carlo Methods, Policy Gradient Methods, On-policy Prediction with Approximation, etc.

When determining the one or more controlling actions associated with the yaw offset of the first wind turbine, it is possible to take into account one or more reward values. For example, reference reward values or predicted reward values of a predefined value function can be used. Reward values can, in particular, include the sum of power outputs of both the first wind turbine and the second wind turbine.

In some cases, the one or more controlling actions are determined based on a predefined set of controlling actions (e.g., by an appropriate selection process from the predefined set), wherein each of the controlling actions in the predefined set of controlling actions is associated with a reference reward value given that that respective controlling action is determined at the current states of the first wind turbine and of the second wind turbine.

A respective reference reward for each controlling action in the predefined set of controlling actions may be respectively generated by processing the current states of the first wind turbine and of the second wind turbine together with the corresponding controlling action using an action reward neural network. The action reward neural network may be trained by supervised learning using labeled data obtained from experiences. Alternatively, a database which stores arrays or tables representing mappings from (current states of the first wind turbine and of the second wind turbine, action) pairs to reference rewards may be searched.

In some implementations, the action reward neural network is configured to receive as input current states of the first wind turbine and of the second wind turbine together with a controlling action and to process the current states of the first wind turbine and of the second wind turbine together with the controlling action to generate a respective reference reward for the action.

The one or more controlling actions are determined based on the predefined set of controlling actions taking the respective reference reward value into account. For example, the one or more controlling actions may be determined as one or more controlling actions with the maximum reference reward or maximum sum of reference rewards. Sometimes, to balance exploration and exploitation of the reinforcement learning algorithm, the one or more controlling actions are determined based on the predefined set of controlling actions using an arbitrary selection. For instance, it would be possible to randomly or at least partly randomly select (arbitrary selection) one or more random controlling action from the predefined set of controlling actions with a probability $\epsilon$ ($0<\epsilon<1$) and select one or more controlling actions with the maximum reference reward or maximum sum of reference reward with a probability $1-\epsilon$. It is preferred to set $0<\epsilon<0.1$.

In some other cases, a reward value for a future point in time may be predicted, after multiple iterations of said applying the determined one or more controlling actions based on a predefined value function of the reinforcement learning algorithm, wherein the one or more controlling actions are determined based on the predefined set of controlling actions taking the predicted reward value into account.

The value function is used to predict a long-term reward, such as, several hours, a whole day, a week and so on. On this timescale, typically the environmental conditions change. On the other hand, the above-mentioned reference reward is used to estimate a short-term reward, such as, one minute or several minutes where environmental conditions are considered to be rather stable.

For example, it would be possible to predict a respective reward value for a future point in time for each possible chain of controlling actions selected from the predefined set of controlling actions, respectively, by processing the current states of the first wind turbine and of the second wind turbine of the current pair, together with the corresponding chain of controlling actions using an action value neural network. The action value neural network may be trained by supervised learning using labeled data obtained from experiences. Alternatively, the value function may be a predefined linear function.

In some implementations, the action value neural network is configured to receive as input current states of the first wind turbine and of the second wind turbine together with a chain of controlling actions and to process the current states of the first wind turbine and of the second wind turbine together with the chain of controlling actions to generate a respective reward value for a future point for the possible chains of controlling actions.

After generating reward values of all or part of possible chains of controlling actions starting from the current state and ending at the future point, it is possible to determine the chain of controlling actions with the highest predicted reward value as the one or more controlling actions to be performed.

At step 406, the determined one or more controlling actions are applied to the first wind turbine. After the determination of the one or more controlling actions by the reinforcement learning algorithm, it is possible to apply the one or more controlling actions to control the yaw offset of the first wind turbine.

In some cases, for the action-reward methods, upon applying the determined one or more controlling actions, measurement data associated with a current reward value is received, and a comparison between the reference reward value and the current reward value is performed, and the reinforcement learning algorithm is trained based on the comparison.

In some other cases, for the action-value methods, upon the multiple iterations of said applying the determined one or more controlling actions, it is possible to receive a measurement associated with a current aggregate reward value across the multiple iterations, perform a comparison between the predicted reward value and the current aggregate reward value, and train the reinforcement learning algorithm based on the comparison.

In addition, either the reference reward or the predefined value function comprises a sum of power outputs of both the first wind turbine and the second wind turbine or other parameters for assessing the performance of both the wind turbines.

Next, a further iteration 489 of step 481 is performed: In various embodiments, a general reinforcement learning algorithm based on the method 400 may be executed for controlling yaw offsets of all the wind turbines in the wind turbine farm 200. This can be achieved by toggling through the various pairs of adjacent wind turbines.

There are various options available for implementing the selection logic at step 482. For instance, after finishing controlling the yaw offset of the first wind turbine of an initial active pair, the next pair selected at the next iteration 489 of step 482 may include the second wind turbine of the initial active pair as an upstream wind turbine of a further downstream wind turbine. This means: the second wind turbine of the initial active pair of a first iteration 489 is the first wind turbine of the subsequent active pair of a subsequent, second iteration 489. Such scenario corresponds to moving through pairs of the wind turbines of the wind farm along the wind direction.

The method 400 for controlling the yaw offset of a wind turbine can learn by the reinforcement learning algorithms from direct interaction with the environment, without requiring exemplary supervision or complete models of the environment. The reinforcement learning algorithms can also make use of various environmental parameters to precisely select controlling actions of the yaw offset of the wind turbine. In addition, the learning process of the reinforcement learning algorithms continues during normal operation of the wind turbine, therefore, the reinforcement learning algorithms can learn to adapt to new states. Thus, optimal short-term or long-term goals, such as, a sum of power outputs of both the first wind turbine and the second wind turbine, can be achieved by applying the reinforcement learning algorithms to control the wind turbine.

In addition, the method 400 is easy to implement and does not need high-performance computing resources or devices, because the method 400 takes into account pairs of wind turbines when determining the controlling actions associated with the yaw offsets.

While method 400 has been explained in connection with a scenario in which at step 482 pairs of wind turbines are selected, it would generally be possible to select, at step 482 subgroups of all wind turbines of the wind farm that include more than two wind turbines, e.g., three or four wind turbines. The wind turbines of the subgroup can be arranged in sequence along the wind direction. Here, the controlling action of the yaw offset of a first wind turbine—upstream along the wind direction—can be determined depending on the current states of the remaining wind turbines in the subgroup.

As will be appreciated from the above, method 400 can be labeled as a bottom-up approach for setting the yaw offset. This is because there are multiple iterations 489, each iteration 489 being associated with a respective wind turbine. In other examples, a top-down approach would be possible where the reinforcement learning algorithm is used to concurrently set the yaw offsets of multiple wind turbines. Such a scenario is explained in connection with FIG. 10.

Figure 10:
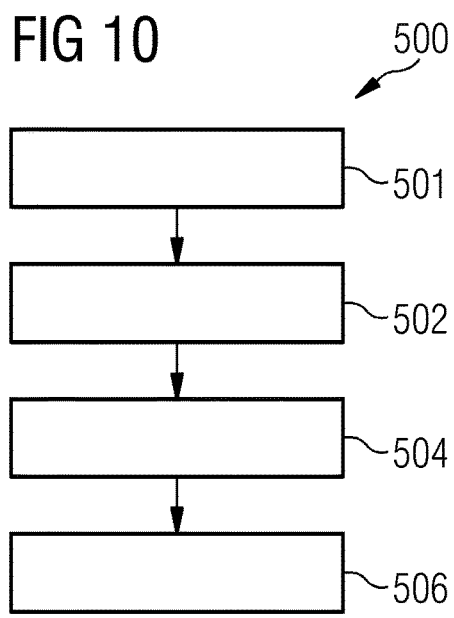
FIG. 10 is a flow diagram of an example method for controlling yaw offsets of a plurality of wind turbines being arranged in sequence along a wind direction.

FIG. 10 is a flow diagram of an example method 500 for controlling yaw offsets of a plurality of wind turbines. The plurality of wind turbines are arranged in sequence along a wind direction 205. The plurality of wind turbines can form a subgroup of all wind turbines of a wind farm. For convenience, the method 500 will be explained as being performed by a system of one or more computers located in one or more locations. For example, a reinforcement learning system running one or more reinforcement learning algorithms disclosed in this application, can perform the method 500. Other devices including a control circuitry could implement the method of FIG. 10. The method may be executed by a processor upon loading program code, e.g., provided by a computer-readable storage medium, a computer program or a computer program product.

The method of FIG. 10 can employ one or more reinforcement learning algorithms 700 as described above in connection with the preceding FIGS. 1-8.

At optional step 501, the reinforcement learning algorithm is pre-trained by using tuples of the following data: wind directions, wind speeds, yaw offsets, and sums of power outputs, wherein all the data are obtained from any plurality of wind turbines that are arranged in sequence along the wind directions or expert knowledge. The data may comprise locations of wakes generated by each wind turbine of the plurality of wind turbines.

For example, by referring to FIG. 1, a general reinforcement learning algorithm for all or part of the wind turbines of the wind turbine farm 200 can be trained by using the data obtained from any wind turbine sequence of the wind turbine farm 200, such as, wind turbine sequences starting with 201a, 201e, 201i, and 201m, respectively. Alternatively or additionally, a specific reinforcement learning algorithm for each wind turbine sequence can also be trained by using the data obtained from any wind turbine sequence of the wind turbine farm 200.

At step 502, for each wind turbine of the plurality of wind turbines, data indicative of a respective current state is received. The plurality of wind turbines may be arranged in sequence of along a wind direction 205, of the wind farm 200. The respective current state of each wind turbine of the plurality of wind turbines specifies one or more of the following: a wind direction, a wind speed, or the yaw offset. The controlling actions comprise setting the yaw offset within a range of −45° and +45°. The respective current state may specify locations of wakes generated by each wind turbine of the plurality of wind turbines as well.

At step 504, controlling actions associated with the yaw offsets of the plurality of wind turbines based on the current states of the wind turbines of the plurality of wind turbines and a reinforcement learning algorithm, e.g., the reinforcement learning algorithm 700 of FIG. 5, are determined. This occurs in a combined manner. This means that the reinforcement learning algorithm is trained to determine, in one run, controlling actions associated with multiple yaw offsets for all wind turbines of the plurality of wind turbines. This may be labeled a top-down approach.

The reinforcement learning algorithm may utilize any one of the above-mentioned action-reward methods or the action-value methods. In addition, the reinforcement learning algorithm also may utilize other exist reinforcement learning algorithms, such as, Q-Learning, Deep Q-Learning, Double Deep Q-Learning, Dynamic Programming (DP), Temporal-Difference (TD) Learning, Monte Carlo Methods, Policy Gradient Methods, On-policy Prediction with Approximation, etc.

When determining the controlling actions associated with the yaw offsets of the plurality of wind turbines, it is possible to take into account one or more reward values. For example, reference reward values or predicted reward values of a predefined value function can be used. Reward values can, in particular, comprise a sum of power outputs of all the wind turbines of the plurality of wind turbines.

In some cases, the controlling actions are determined based on a predefined set of controlling actions (e.g., by an appropriate selection process) from the predefined set, wherein each of the controlling actions in the predefined set of controlling actions is associated with a reference reward value given that that respective controlling action is determined at the current state.

An associated reference reward for each controlling action in the predefined set of controlling actions may be respectively generated by processing the current states of the wind turbines of the plurality of wind turbines together with the corresponding controlling actions of all the wind turbines of the plurality of wind turbines using an action reward neural network. The action reward neural network may be trained by supervised learning using labeled data obtained from experiences. Alternatively, a database which stores arrays or tables representing mappings from (current states of the wind turbines of the plurality of wind turbines, actions) pairs to reference rewards may be searched.

In some implementations, the action reward neural network is configured to receive as input the current states of the wind turbines of the plurality of wind turbines together with corresponding controlling actions of all wind turbines of the plurality of wind turbines and to process the current states of the wind turbines of the plurality of wind turbines together with corresponding controlling actions of all wind turbines of the plurality of wind turbines to generate a respective reference reward for the actions.

The controlling actions are determined based on the predefined set of controlling actions taking the respective reference reward value into account. For example, the controlling actions may be determined by selecting the controlling actions with the maximum reference reward or maximum sum of reference rewards. Sometimes, to balance exploration and exploitation of the reinforcement learning algorithm, the controlling actions are determined based on the predefined set of controlling actions using an arbitrary selection. For instance, it would be possible to randomly or at least partly randomly select (arbitrary selection) controlling actions from the predefined set of controlling actions with a probability $\epsilon$ ($0<\epsilon<1$) and select controlling actions with the maximum reference reward or maximum sum of reference reward with a probability $1-\epsilon$. It is preferred to set $0<\epsilon<0.1$.

In some other cases, a reward value for a future point in time may be predicted based on a predefined value function of the reinforcement learning algorithm, wherein the controlling actions are determined based on a predefined set of controlling actions taking the predicted reward value into account.

The value function is used to predict a long-term reward, such as, several hours, a whole day, a week and so on. On this timescale, typically the environmental conditions change. On the other hand, the above-mentioned reference reward is used to estimate a short-term reward, such as, one minute or several minutes where environmental conditions are considered to be rather stable. The value function may comprise a linear function or a neural network For example, it would be possible to predict a respective reward value for a future point in time for each possible chain of controlling actions selected from the predefined set of controlling actions, respectively, by processing the current states of the wind turbines of the plurality of wind turbines together with the corresponding controlling actions of all the wind turbines of the plurality of wind turbines using an action value neural network. The action value neural network may be trained by supervised learning using labeled data obtained from experiences. Alternatively, the value function may be a predefined linear function.

In some implementations, the action value neural network is configured to receive as input current states of the wind turbines of the plurality of wind turbines together with the corresponding controlling actions of all the wind turbines of the plurality of wind turbines and to process the current states of the wind turbines of the plurality of wind turbines together with the corresponding controlling actions of all the wind turbines of the plurality of wind turbines to generate a respective reward value for a future point for the chain of controlling actions.

After generating reward values for a future point of all or part of possible chains of controlling actions starting from the current state and ending at the future point, it is possible to determine the chain of controlling actions with the highest predicted reward value as the controlling actions associated with the yaw offsets of the plurality of wind turbines to be performed.

At step 506, the determined controlling actions are applied to the wind turbines of the plurality of wind turbines, respectively. After the determination of the controlling actions associated with the yaw offsets of the plurality of wind turbines by the reinforcement learning algorithm, it is possible to apply the determined controlling actions to control the yaw offsets of the plurality of wind turbines.

In some cases, for the action-reward methods, upon applying the determined controlling actions, measurement data associated with a current reward value is received, and a comparison between the reference reward value and the current reward value is performed, and the reinforcement learning algorithm is trained based on the comparison.

In some other cases, for the action-value methods, upon applying the determined controlling actions, it is possible to receive a measurement associated with a current aggregate reward value, perform a comparison between the predicted reward value and the current aggregate reward value, and train the reinforcement learning algorithm based on the comparison.

In addition, either the reference reward or the predefined value function comprises a sum of power outputs of all the wind turbines of the plurality of wind turbines, or other parameters for assessing the performance of all the wind turbines.

In various embodiments, a general reinforcement learning algorithm based on the method 500 may be executed for controlling yaw offsets of all the wind turbines in a wind turbine farm, such as the wind turbine farm 200. Alternatively, each sequence of the wind turbines of a wind farm may have its own reinforcement learning algorithm for controlling yaw offsets of all the wind turbines of the respective sequence based on the method 500.

The method 500 for controlling yaw offsets of all wind turbines arranged in a sequence along the wind direction can learn by the reinforcement learning algorithms from direct interaction with the environment, without requiring exemplary supervision or complete models of the environment. The reinforcement learning algorithms can also make use of as many environmental parameters indicating states of wind turbines as possible to precisely select controlling actions of the yaw offsets of all the wind turbines. In addition, the learning process of the reinforcement learning algorithms continues during normal operation of the wind turbine, therefore, the reinforcement learning algorithms can learn to adapt to new states. Thus, optimal short-term or long-term goals, such as, power output of the whole wind turbine farm, can be achieved by applying the reinforcement learning algorithms to control yaw offsets of all the wind turbines of each sequence, simultaneously.

In various embodiments described herein, a prediction of future states of one or more wind turbines in a wind turbine farm can be performed by using a states prediction model. The states prediction model may be a neural network.

The states prediction neural network is configured to receive as input a current weather information and information of mechanical structure of the one or more wind turbines to generate future states of the one or more wind turbines including predictions of at least one of the following parameters: a wind speed, a turbulence intensity, a site elevation, a temperature, a vertical wind shear, a location of the generated wake or a horizontal wind shear. The current weather information comprises various images and/or data captured by weather satellites or radars, data measured by equipment or devices at weather stations.

Also, a current weather information and information of mechanical structure of the one or more wind turbines may be received and future states of the one or more wind turbines may be generated by the state's prediction neural network. Then, it is possible to determine one or more controlling actions of the one or more wind turbines based on not only the current state of the one or more wind turbines but also the future states of the one or more wind turbines and a reinforcement learning algorithm. Both the short-term reward and the long-term reward are predicted by further taking the future environmental states into account.

For example, for the method 400 of FIG. 9, the one or more controlling actions associated with the yaw offset of the first wind turbine may be determined based on the current state of the first wind turbine, the current state of the second wind turbine, the predicted future states of the first wind turbine and of the second wind turbine, and a reinforcement learning algorithm.

For the method 500 of FIG. 10, the controlling actions associated with the yaw offsets of the plurality of wind turbines may be determined based on the current states of the wind turbines of the plurality of wind turbines, the predicted future states of the wind turbines of the plurality of wind turbines, and a reinforcement learning algorithm.

By further taking predictions of future states into account, both the method 400 and the method 500 for controlling yaw offsets of one or more wind turbines can utilize more information of the environment (such as, weather information) to determine more precise and reliable controlling actions and further obtain more power output of a wind farm.

In addition, before executing methods 400 or 500, there may be a step or procedure to determine whether a wake generated by an upstream wind turbine will influence a downstream wind turbine or not, for each wind turbine of a wind turbine farm. The determination can be performed by some algorithm taking a wind direction and a distance between the upstream wind turbine and the downstream wind turbine into account. If there are influences, the methods 400 or 500 will be executed.

FIG. 11 schematically illustrates aspects with respect to a device 800. The device 800 includes one or more processors 810 and a memory 820. The one or more processors 810 can load program code from the memory 820 and execute the loaded program code. The program code could define the reinforcement learning algorithm 700 and the modules 701-704 (cf. FIG. 6).

Then, the one or more processors 810 can perform various techniques as described herein to control a yaw offset of an upstream wind turbine of a wind turbine pair of a wind farm (e.g., the method 400). The one or more processors 810 may comprise CPUs, GPUs, TPUs, or any other neural network processors.

Specifically, the one or more processors 810 are configured to receive data indicative of a current state of the first wind turbine and a current state of a second wind turbine adjacent to the first wind turbine downstream, determine one or more controlling actions associated with the yaw offset of the first wind turbine based on the current state of the first wind turbine, the current state of the second wind turbine, and a reinforcement learning algorithm 700, and apply the determined one or more controlling actions to the first wind turbine.

Both the first and second wind turbines can thus include a communication interface 81, one or more sensors 82, and a control unit 83, respectively.

The device 800 includes a communication interface 830. For example, the device 800 may receive data indicative of a current state of the first wind turbine and of a current state of a second wind turbine adjacent to the first wind turbine downstream, via the communication interface 830 from sensors 82 associated with both the first and second wind turbines, respectively. It would be also possible that the device 800 receives a current weather information from a database 840 that belongs to a meteorological center. In addition, the device 800 may send, to the controlling element 83 of the first wind turbine, controlling signals including the one or more controlling actions associated with the yaw offset of the first wind turbine, via the communication interface 830.

The device 800 may include a user interface 850 for users to interact with the device 800. For example, the user can input data or information into the device 800 via the user interface 850, such as, tuples of the following data: wind directions, wind speeds, yaw offsets, controlling actions, and sums of power outputs, wherein all the data are obtained from any two wind turbines that are adjacent to each other along the wind directions or expert knowledge, as well as information of mechanical structures of both the first and second wind turbines.

The device 800 may be used to execute the program codes of the above-mentioned reward neural network, value neural network, and states prediction neural network, respectively.

FIG. 12 schematically illustrates aspects with respect to a device 900 that is similar to the device 800. The device 900 includes one or more processors 910 and a memory 920. The one or more processors 910 can load program code from the memory 920 and execute the loaded program code. The program code could define the reinforcement learning algorithm 700 and the modules 701-704 (cf. FIG. 6). Then, the one or more processors 910 also can perform various techniques as described herein to control yaw offsets of a plurality of wind turbines being arranged in sequence along a wind direction 205 in a wind turbine farm 200 (e.g., the method 500). The one or more processors 910 may comprise CPUs, GPUs, TPUs, or any other neural network processors.

Specifically, the one or more processors 910 are configured to receive data indicative of a respective current state for each wind turbine of the plurality of wind turbines, determine controlling actions associated with the yaw offsets of the plurality of wind turbines based on the current states of the wind turbines of the plurality of wind turbines and a reinforcement learning algorithm 700, and apply the determined controlling actions to the wind turbines of the plurality of wind turbines.

Each wind turbine of the plurality of wind turbines can thus include a communication interface 81, one or more sensors 82, and a control unit 83, respectively.

The device 900 includes a communication interface 930. For example, the device 900 may receive data indicative of a respective current state for each wind turbine of the plurality of wind turbines, via the communication interface 930 from sensors 82 associated with each wind turbine of the plurality of wind turbines, respectively. It would be also possible that the device 900 receives a current weather information from a database 840 that belongs to a meteorological center. In addition, the device 900 may send, to the controlling element 83 of each wind turbine of the plurality of wind turbines, corresponding controlling signals including corresponding controlling actions associated with the yaw offset of the corresponding wind turbine, respectively, via the communication interface 930.

The device 900 may include a user interface 940 for users to interact with the device 900. For example, the user can input data or information into the device 900 via the user interface 940, such as, tuples of the following data: wind directions, wind speeds, yaw offsets, and sums of power outputs, wherein all the data are obtained from any plurality of wind turbines that are arranged in sequence along the wind directions or expert knowledge, as well as information of mechanical structures of each wind turbine of the plurality of wind turbines.

The device 900 may be used to execute the program codes of the above-mentioned reward neural network, value neural network, and states prediction neural network, respectively.

Summarizing, techniques based on reinforcement learning, of controlling a yaw offset of an upstream wind turbine and of controlling yaw offsets of a plurality of wind turbines being arranged in sequence along a wind direction, in a wind farm, have been described. This is used to make efficient use of various environmental information, including but not limited to the wind speed, to control the yaw offsets of an upstream wind turbine, or of a plurality of wind turbines being arranged in sequence along a wind direction, thereby achieving an optimal power output of a whole wind farm.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a yaw offset of a first wind turbine, the method comprising:
    receiving data indicative of a current state of the first wind turbine and of a current state of a second wind turbine adjacent to the first wind turbine downstream along a wind direction;
    determining one or more controlling actions associated with the yaw offset of the first wind turbine based on the current state of the first wind turbine, the current state of the second wind turbine, and a reinforcement learning algorithm; and
    controlling the yaw offset of the first wind turbine by applying the one or more controlling actions to the first wind turbine;
    wherein the reinforcement learning algorithm utilizes:
        an action-reward method, in which each controlling action is associated with a reference reward value, and the reinforcement learning algorithm is trained based on a comparison between the reference reward value and a current reward value; or
        an action-value method, in which the reinforcement learning algorithm predicts a reward value for a future point in time, based on a predefined value function, with the one or more controlling actions determined by taking into account the predicted reward value.

2. The method of claim 1, wherein the current state of the first wind turbine and the current state of the second wind turbine specify one or more of the following: the wind direction at a site of the respective wind turbine, a wind speed at the site of the respective wind turbine, or the yaw offset of the respective wind turbine.

3. The method of claim 1, wherein the one or more controlling actions comprise setting the yaw offset within a range of −45° and +45°.

4. The method of claim 1, wherein the one or more controlling actions are determined based on a predefined set of controlling actions, wherein each of the controlling actions in the predefined set of controlling actions is associated with the reference reward value given that that respective controlling action is determined at the current state of the first wind turbine and at the current state of the second wind turbine.

5. The method of claim 4, wherein the one or more controlling actions are determined based on the predefined set of controlling actions taking the respective reference reward value into account.

6. The method of claim 4, wherein the one or more controlling actions are determined based on the predefined set of controlling actions using an arbitrary selection.

7. The method of claim 4, further comprising:
    upon applying the one or more controlling actions: receiving a measurement data associated with the current reward value.

8. The method of claim 1, wherein the pre-defined value function comprises a linear function or a neural network.

9. The method of claim 8, further comprising:
    upon completing the multiple iterations of the applying the one or more controlling actions: receiving measurement data associated with a current aggregate reward value across the multiple iterations;
    performing a comparison between the predicted reward value and the current aggregate reward value; and
    training the reinforcement learning algorithm based on the comparison.

10. The method of claim 4, wherein the reward value comprises a sum of power outputs of both the first wind turbine and the second wind turbine.

11. The method of claim 1, further comprising:
    pre-training the reinforcement learning algorithm by using tuples of the following data: wind directions, wind speeds, yaw offsets, and sums of power outputs, wherein the tuples of the data are obtained from two reference wind turbines that are adjacent to each other along the wind directions.

12. The method of claim 1, further comprising:
    receiving data indicative of a current state of a third wind turbine adjacent to the second wind turbine downstream along the wind direction;
    determining one or more further controlling actions associated with a further yaw offset of the second wind turbine based on the current state of the second wind turbine, the current state of the third wind turbine, and the reinforcement learning algorithm;
    applying the one or more further controlling actions to the second wind turbine.

13. The method of claim 12, wherein the determining of the one or more further controlling actions is performed after the determining of the one or more controlling actions.

14. A device for controlling a yaw offset of a first wind turbine, the device comprising:
    one or more processors configured to:
    receive data indicative of a current state of the first wind turbine and of a current state of a second wind turbine adjacent to the first wind turbine downstream along a wind direction;
    determine one or more controlling actions associated with the yaw offset of the first wind turbine based on the current state of the first wind turbine, the current state of the second wind turbine, and a reinforcement learning algorithm; and
    apply the one or more controlling actions to the first wind turbine;
    wherein the reinforcement learning algorithm utilizes:
        an action-reward method, in which each controlling action is associated with a reference reward value, and the reinforcement learning algorithm is trained based on a comparison between the reference reward value and a current reward value; or an action-value method, in which the reinforcement learning algorithm predicts a reward value for a future point in time, based on a predefined value function, with the one or more controlling actions determined by taking into account the predicted reward value.

15. The device of claim 14, wherein the one or more processors are configured to perform a method of controlling the yaw offset.

16. A method of controlling yaw offsets of a plurality of wind turbines, the wind turbines of the plurality of wind turbines being arranged in sequence along a wind direction, the method comprising:

for each wind turbine of the plurality of wind turbines:
receiving data indicative of a respective current state;
determining controlling actions associated with the yaw offsets of each wind turbine of the plurality of wind turbines based on the current states of the wind turbines of the plurality of wind turbines and a reinforcement learning algorithm, the reinforcement learning algorithm providing the controlling actions for each wind turbine of the plurality of wind turbines in a single execution; and controlling the yaw offset of the first wind turbine by applying the controlling actions to the wind turbines of the plurality of wind turbines;

wherein the reinforcement learning algorithm utilizes:
an action-reward method, in which each controlling action is associated with a reference reward value, and the reinforcement learning algorithm is trained based on a comparison between the reference reward value and a current reward value; or an action-value method, in which the reinforcement learning algorithm predicts a reward value for a future point in time, based on a predefined value function, with the one or more controlling actions determined by taking into account the predicted reward value.

17. A device for controlling yaw offsets of a plurality of wind turbines, the wind turbines of the plurality of wind turbines being arranged in sequence along a wind direction, the device comprising:

one or more processors, the one or more processors being configured to:

receive data indicative of a respective current state for each wind turbine of the plurality of wind turbines;

determine controlling actions associated with the yaw offsets of the plurality of wind turbines based on the current states of the wind turbines of the plurality of wind turbines and a reinforcement learning algorithm, the reinforcement learning algorithm providing the controlling actions for each wind turbine of the plurality of wind turbines in a single execution; and control the yaw offset of the first wind turbine by applying the controlling actions to the wind turbines of the plurality of wind turbines;

wherein the reinforcement learning algorithm utilizes:
an action-reward method, in which each controlling action is associated with a reference reward value, and the reinforcement learning algorithm is trained based on a comparison between the reference reward value and a current reward value; or an action-value method, in which the reinforcement learning algorithm predicts a reward value for a future point in time, based on a predefined value function, with the one or more controlling actions determined by taking into account the predicted reward value.

* * * * *